Sept. 10, 1940.   H. C. BOWEN   2,213,947
FLUID PRESSURE BRAKING SYSTEM
Filed Sept. 27, 1937   3 Sheets-Sheet 3

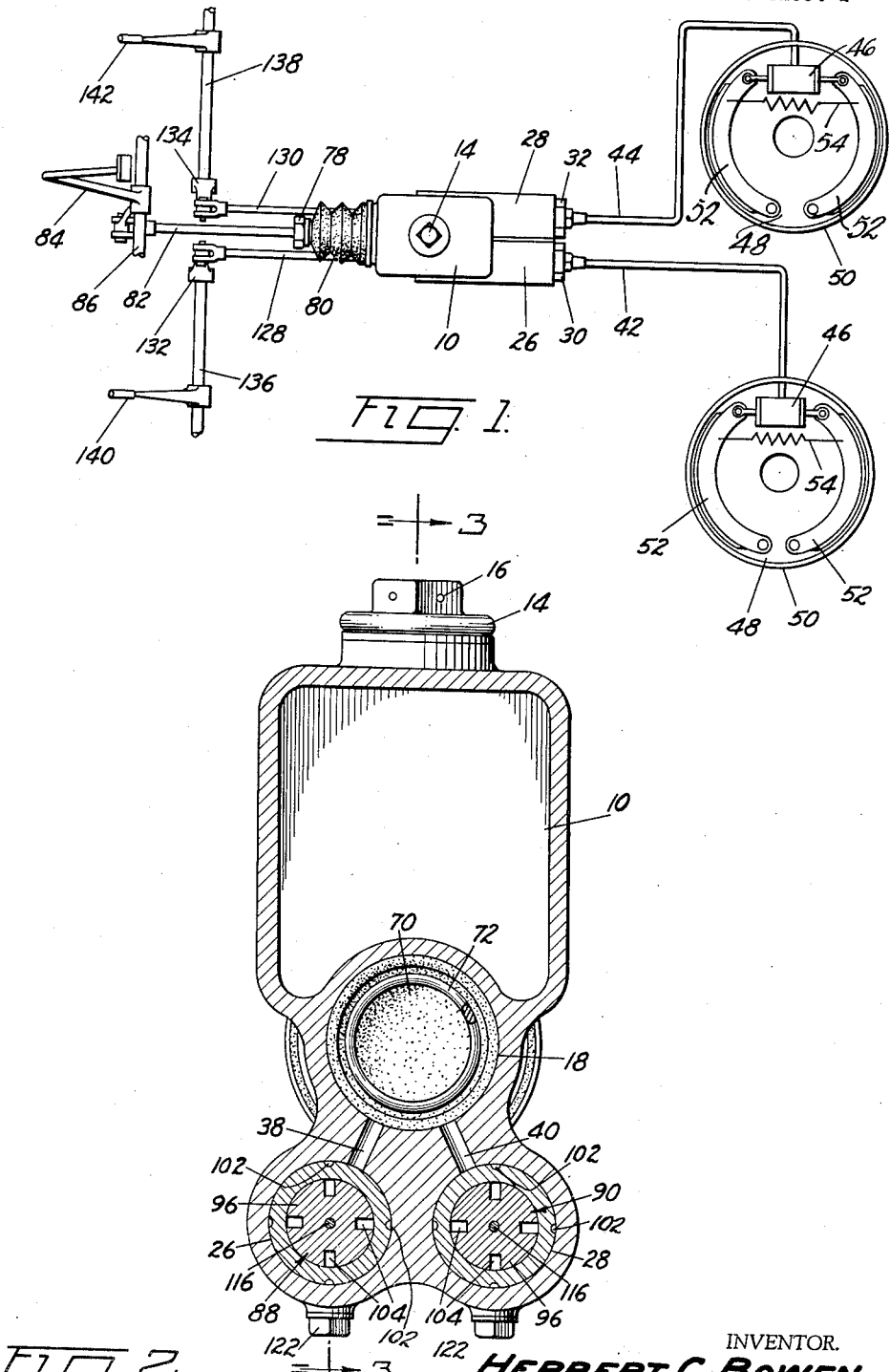

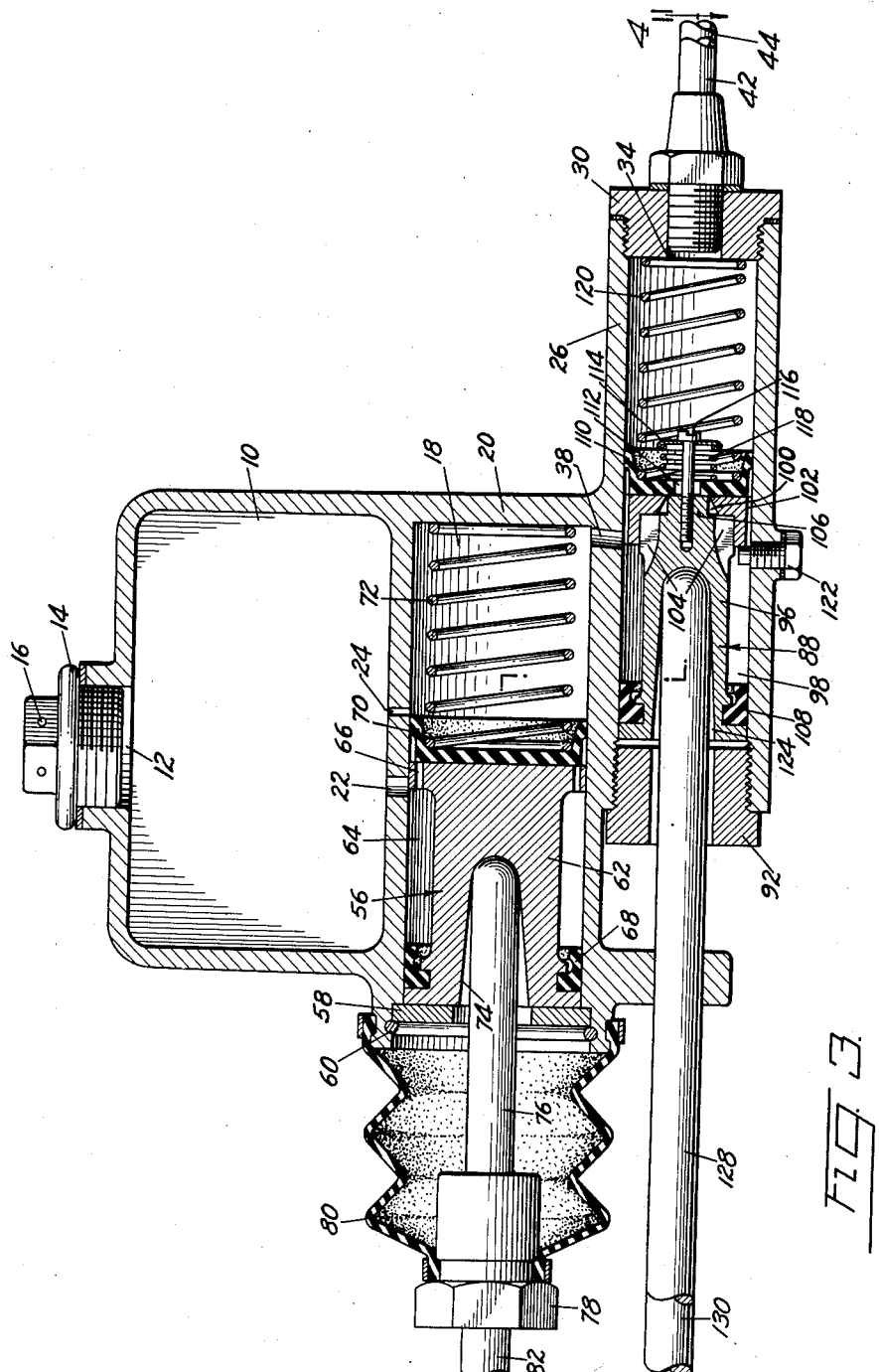

INVENTOR.
HERBERT C. BOWEN
BY
Williams, Bradbury, McCaleb & Hinkle
ATTORNEYS.

Patented Sept. 10, 1940

2,213,947

UNITED STATES PATENT OFFICE 2,213,947

FLUID PRESSURE BRAKING SYSTEM

Herbert C. Bowen, Detroit, Mich., assignor to Hydraulic Brake Company, Detroit, Mich., a corporation of California Application September 27, 1937, Serial No. 165,828

5 Claims. (Cl. 188—152)

This invention relates to fluid pressure braking systems.

Broadly, the invention comprehends a fluid pressure braking system including a fluid pressure producing device operative to actuate two or more fluid pressure actuated motors simultaneously, and also to selectively actuate the motors.

A preferred embodiment of the invention illustrates a fluid pressure producing device including a fluid reservoir, a large cylinder supplied from the reservoir, and a pair of relatively small cylinders each communicating with the large cylinder. The small cylinders are connected as by fluid pressure delivery lines to fluid pressure actuated motors arranged for the actuation of the pair of brakes associated with a pair of oppositely disposed wheels of a motor vehicle. A piston reciprocable in the large cylinder may be actuated on its compression stroke as by a conventional foot pedal lever, and corresponding pistons reciprocable in the small cylinders, each having means for by-passing fluid when in its retracted position, may be selectively actuated by hand levers.

An object of the invention is to provide a fluid pressure braking system operative to actuate a pair of brakes simultaneously, or to operate the same brakes individually.

Other objects of the invention will appear from the following description taken in connection with the drawings forming a part of this specification, and in which:

Fig. 1 is a schematic view of a fluid pressure braking system embodying the invention;

Fig. 2 is an end elevation of a fluid pressure producing device;

Fig. 3 is a vertical sectional view of the fluid pressure producing device; and

Figure 4:
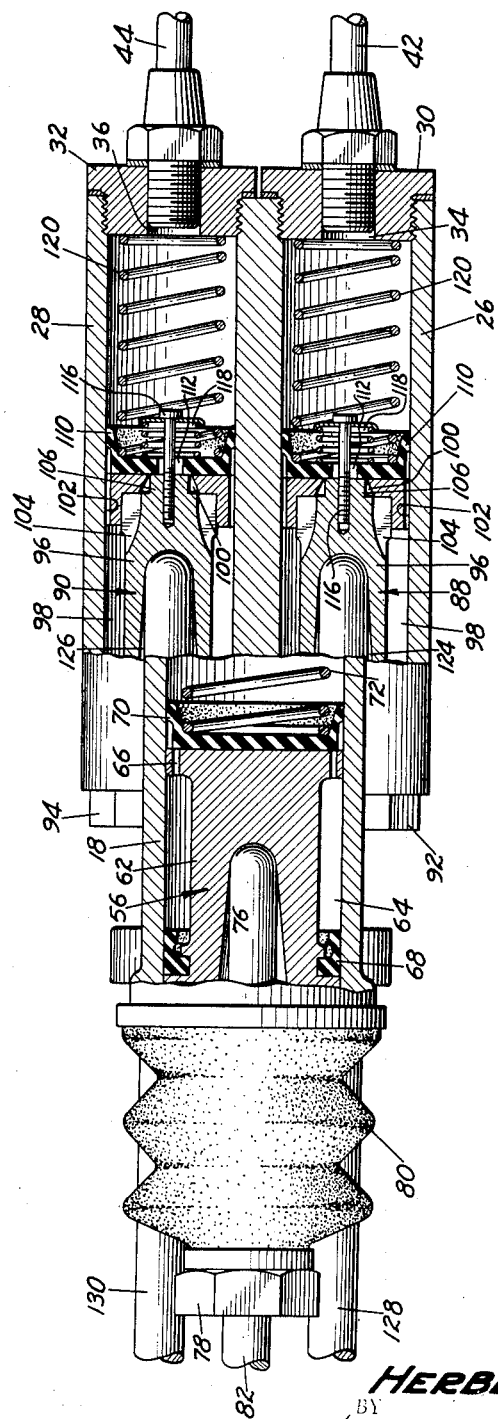
Fig. 4 is a longitudinal sectional view of the fluid pressure producing device.

Referring to the drawings for more specific details of the invention, 10 represents a fluid reservoir having a filling opening 12 normally closed as by a plug 14 having openings 16 for venting the reservoir to the atmosphere. A cylinder 18 formed in the bottom of the reservoir has one of its ends closed as at 20 and its other end opening outside of the reservoir, and arranged in the wall of the cylinder are spaced ports 22 and 24 providing communications between the cylinder and the reservoir.

A pair of corresponding cylinders 26 and 28, arranged in parallel relation to one another and to the cylinder 18, have heads 30 and 32 provided with discharge ports 34 and 36, and arranged in the wall of these cylinders are ports 38 and 40 opening into the cylinder 18 adjacent its closed end and providing communications between the cylinders 26 and 28 and the cylinder 18.

The discharge ports 34 and 36 are connected respectively by fluid pressure delivery pipes or conduits 42 and 44 to fluid pressure actuated motors 46 arranged for the actuation of the brakes associated with a pair of oppositely disposed wheels of a motor vehicle. The brakes may be of any preferred type, each including a fixed support or backing plate 48, a rotatable drum 50 associated with the backing plate, a pair of corresponding interchangeable friction elements or shoes 52 pivoted on the backing plate, a retractile spring 54 connecting the shoes, and a fluid pressure actuated motor corresponding to the motors 46 mounted on the backing plate between the shoes and operative to actuate the shoes into engagement with the drums against the resistance of the retractile spring.

A piston 56 reciprocable in the cylinder 18 is held against displacement by a washer 58 seated on an annular shoulder in the open end of the cylinder and secured in place as by a retaining ring 60 seated in a groove in the wall of the cylinder. The piston 56 has a reduced body portion 62, providing, in conjunction with the wall of the cylinder 18, an annular chamber 64 communicating with the reservoir by way of the port 22, and arranged in the head of the piston are spaced passages 66 providing communications between the annular chamber 64 and that portion of the cylinder 18 forward of the piston.

The piston 56 carries on its skirt a sealing cup 68 for inhibiting seepage of fluid from the cylinder past the piston, and supports on its head a collapsible sealing cup 70 for controlling the passages 66, and a spring 72 interposed between the cup 70 and the head of the cylinder serves to retain the cup 70 against displacement and also to return the piston to its retracted position.

Arranged in the back of the piston is a recess 74 receiving one end of a thrust pin 76, having connected to its other end a coupling 78 connected as by a flexible boot 80 to the open end of the cylinder 18 for the exclusion of dust and other foreign substances, and a rod 82 connects the coupling 78 to a foot pedal lever 84 pivoted on a fixed support 86.

Corresponding pistons 88 and 90 mounted for reciprocation in the cylinders 26 and 28 are held against displacement by retaining rings 92 and 94 suitably secured in the open ends of the cylinders. Each of these pistons includes a body portion 96 of reduced diameter, providing, in conjunction with the associated cylinder, an annular chamber 98 communicating with the cylinder 18 as by way of port 38 or 40, and mounted on the reduced body portion 96 is a relatively movable head having an axial port 100 and spaced passages 102 therethrough providing communications between the annular chamber 98 and that portion of the associated cylinder forward of the piston. As shown, the reduced body portion is slotted as at 104 to provide for the passage of fluid between the head and the body portion, and the free end of the body portion has an extension 106 adapted to enter the port 100 in the head.

The piston carries a sealing cup 108 for inhibiting the passage of fluid from the cylinder past the piston, and a collapsible sealing cup 110 on the piston head controls the passages 102. The cup 110 has an axial opening 112, and the perimeter defining this opening overhangs the port 100 and provides in conjunction with the extension 106 an effective seal for the port. A spring-seat 114 is attached to the piston by a screw 116, and a spring 118 interposed between the spring seat and the inner perimeter of the cup serves to more effectively retain this portion of the cup against displacement. The cup 110 is further held against displacement by a spring 120 interposed between the cup and the head of the associated cylinder. The spring 120 also serves to return the piston to its retracted position wherein the head abuts a suitable stop 122. The pistons 88 and 90 have in their backs recesses 124 and 126 for the reception of thrust pins 128 and 130 connected respectively to crank levers 132 and 134 suitably secured on rock shafts 136 and 138, having mounted thereon corresponding operating levers 140 and 142.

In a normal operation, upon depressing the foot pedal lever 84, force is transmitted therefrom through the thrust rod 82 to the piston 56, resulting in movement of the piston on its compression stroke. During the initial movement of the piston on its compression stroke, the sealing cup 70 on the head of the piston 56 closes the port 24, and thereafter as the piston advances fluid is displaced from the cylinder 18 through the ports 38 and 40 into the smaller cylinders 26 and 28 in the chambers 98 back of the heads of the pistons 88 and 90, thence through the passages 102 in the heads of the pistons 88 and 90 into those portions of the cylinders 26 and 28 forward of the pistons. The induction of fluid from the cylinder 18 into the cylinders 26 and 28 may be too rapid to by-pass the heads of the small pistons 88 by way of the passages 102, and in such instances, the pressure on the fluid in the chambers 98 causes relative movement between the parts of the pistons 88 and 90 resulting in opening the ports 100 in the heads of the small pistons so as to establish communication between the chambers 98 and those portions of the cylinders forward of the pistons. The fluid is then discharged from the small cylinders, through the discharge ports 34 and 36 into fluid pressure delivery pipes 42 and 44 into the fluid pressure actuated motors 46, causing energization of the motors and resulting in movement of the shoes 52 into engagement with the drums 50 against the resistance of the retractile springs 54.

Upon release of the foot pedal lever 84, the lever is returned to its retracted position under the influence of a retractile spring, not shown. This results in release of the piston 56, whereupon the piston returns to its retracted position under the influence of the spring 72. As the piston 56 returns to its retracted position, a partial vacuum is created in that portion of the cylinder 18 forward of the piston, resulting in drawing fluid from the reservoir through the port 22 into the chamber 64 of the cylinder 18, thence through the passages 66 in the head of the piston, past the sealing cup 70, into that portion of the chamber forward of the piston, completely filling the cylinder.

During this operation, fluid is returning from the fluid pressure actuated motors 46 and the fluid pressure delivery pipes 42 and 44 to the smaller cylinders 26 and 28 under the influence of the retractile springs 54 connecting the shoes of the respective brakes. The pressure on the fluid returned to the smaller cylinders 26 and 28 is sufficient to cause relative movement between the small pistons 88 and 90 and their respective heads, resulting in opening the ports 100 so that the fluid may be displaced through the ports 100 into the chambers 98, thence through the ports 38 and 40 into the cylinder 18. This may result in overfilling the cylinder 18, and in that event any excess fluid is returned to the reservoir by way of the compensating port 24.

Now, when it is desired to actuate the brakes individually, as in instances where it may be desirable to turn the vehicle abruptly to the right or to the left, the operator may selectively actuate the hand levers 140 and 142 so as to transmit force therefrom through the thrust rods 128 and 130 to either of the pistons 88 or 90. Upon movement of either of the pistons 88 or 90 on its compression stroke, the fluid in the cylinder forward of the head is displaced therefrom through the discharge port and fluid pressure delivery pipe into the fluid pressure actuated motor, causing energization of the motor and resultant actuation of the brakes.

Upon completion of this operation and release of the applied force on the hand lever, the lever is returned to its retracted position under the influence of a retractile spring, not shown. This results in retracting the thrust rod 128 or 130 and release of the piston 88 or 90, whereupon the piston returns to its retracted position under the influence of the spring 120, and as the piston returns to its retracted position a partial vacuum is created in the cylinder forward of the piston. This results in drawing fluid from the large cylinder 18 through the port 38 or 40 into the chamber 98, thence through the passages 102 in the head of the piston into that portion of the cylinder forward of the piston, completely filling the cylinder. As the piston returns to fully retracted position, the head of the piston seats on the stop 122. During this operation fluid is returning from the fluid pressure actuated motor, and fluid pressure delivery pipes connecting the motor, to the cylinder. Accordingly, the cylinder may receive fluid in excess of the quantity necessary to fill the cylinder. Under this condition, the excess fluid creates pressure in the cylinder forward of the piston sufficient to cause relative movement between the parts of the piston, against the resistance of the spring 118, resulting in opening the port 100 so that such excess fluid may be returned from the smaller cylinder to the large cylinder by way of the port 100 in the head of the piston and the port 40, and from the large cylinder to the reservoir by way of the port 24. The spring 118 retains a predetermined pressure on the fluid in the cylinder forward of the piston and in the fluid pressure delivery pipe and motor connected to the cylinder.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure braking system comprising a fluid pressure producing device including three interconnected pressure producing means, fluid pressure actuated motors connected thereto, brakes actuated by the motors, means for actuating one of the pressure producing means to displace fluid therefrom through the remaining pressure producing means so as to actuate the brakes simultaneously, and separate means for actuating each of the remaining pressure producing means so as to actuate the brakes individually.

2. A fluid pressure braking system comprising a fluid pressure producing device including a reservoir, a fluid pressure producing device supplied therefrom including three interconnected cylinders, a piston reciprocable in each of the cylinders, two of the pistons having means for by-passing fluid when in their retracted positions, a fluid pressure actuated motor connected to each of two of the cylinders, a brake actuated by each motor, and a separate actuator for each of the pistons.

3. A fluid pressure braking system comprising a reservoir, a large cylinder supplied therefrom, a piston reciprocable in the large cylinder, an actuator for the piston, a pair of corresponding relatively small cylinders communicating with the large cylinder, a piston reciprocable in each of the corresponding cylinders having means for by-passing fluid when in retracted position, an actuator for each of the pistons in the corresponding cylinders, a fluid pressure motor connected to each of the corresponding cylinders, and a brake actuated by each of the motors.

4. A fluid pressure producing device comprising a reservoir, a large cylinder supplied therefrom, a piston reciprocable in the large cylinder, a pair of relatively small cylinders each communicating with the large cylinder, a piston reciprocable in each of the small cylinders, means for by-passing fluid displaced by the piston in the large cylinder past the pistons in the small cylinders and separate actuating means for each piston.

5. A fluid pressure producing device comprising a reservoir, a large cylinder supplied therefrom, a piston reciprocable in the cylinder, an actuator for the piston, a pair of relatively small cylinders each communicating with the large cylinder, pistons reciprocable in the small cylinders each having means for by-passing fluid when in retracted position, and an actuator for each of the pistons in the small cylinders.

HERBERT C. BOWEN.